United States Patent [19]

Lang et al.

[11] Patent Number: 4,953,365
[45] Date of Patent: Sep. 4, 1990

[54] HELICAL CONVEYOR FREEZER

[75] Inventors: Gary D. Lang, Naperville; Donald S. Finan, Chicago; George D. Rhoades, La Grange, all of Ill.

[73] Assignee: Liquid Carbonic Corporation, Chicago, Ill.

[21] Appl. No.: 373,056

[22] Filed: Jun. 28, 1989

[51] Int. Cl.$^5$ .............................................. F25D 25/02
[52] U.S. Cl. ........................................ 62/381; 198/778
[58] Field of Search ........................... 62/381; 198/778

[56] References Cited

U.S. PATENT DOCUMENTS

| | | | |
|---|---|---|---|
| 3,315,492 | 4/1967 | Dreksler | 62/381 |
| 3,733,848 | 5/1973 | Duron et al. | 62/381 |
| 3,938,651 | 2/1976 | Alfred et al. | 198/136 |
| 4,023,381 | 5/1977 | Onodera | 62/381 |
| 4,078,394 | 3/1978 | Chamberlain et al. | 62/203 |
| 4,229,623 | 4/1988 | Tyree, Jr. et al. | 62/63 |
| 4,324,110 | 4/1982 | Lovette, Jr. et al. | 62/381 |
| 4,356,707 | 11/1982 | Tyree, Jr. et al. | 62/381 |
| 4,480,535 | 11/1984 | Jaxmar et al. | 99/476 |
| 4,631,029 | 12/1986 | Lanham et al. | 432/133 |

Primary Examiner—Ronald C. Capossela
Attorney, Agent, or Firm—Fitch, Even, Tabin & Flannery

[57] ABSTRACT

A food freezer having a thermally insulated enclosure wherein an endless conveyor having a lower loading section, a main helical section and an uppermost unloading section is primarily driven by engagement between its inner edge and the sidewall of a rotatable center cage, which includes a plurality of uniformly spaced apart vertical bars. The lower end of the center cage can be blocked, and a centrifugal blower is axially located at the upper end of the cage to suck gas from the interior of the cage and discharge it horizontally outward along the undersurface of the top wall so that it flows outward, then downward and, finally, radially inward in an overall generally toroidal pattern through the tiers of the helical belt section where it withdraws heat from the freezes the food products being carried therealong. Various arrangements, e.g., adjustable restrictors, are illustrated for creating vertical gradients in the radial inflow of gas through the helical section so that the cold gas flows inward at a greater rate in lower regions of the helical section than in the upper region. Cryogen injection devices for spraying a cryogen, such as liquid $CO_2$ or liquid $N_2$, radially inward to impinge upon the food products on the belt, may be located at selected positions about the perimeter and at various vertical levels. Radial inflow of gas adds to the effectiveness of the impinging spray against the food products; however, the overall freezer construction is also advantageously employed with mechanical cooling of the gaseous atmosphere via one or more heat exchange coils.

25 Claims, 6 Drawing Sheets

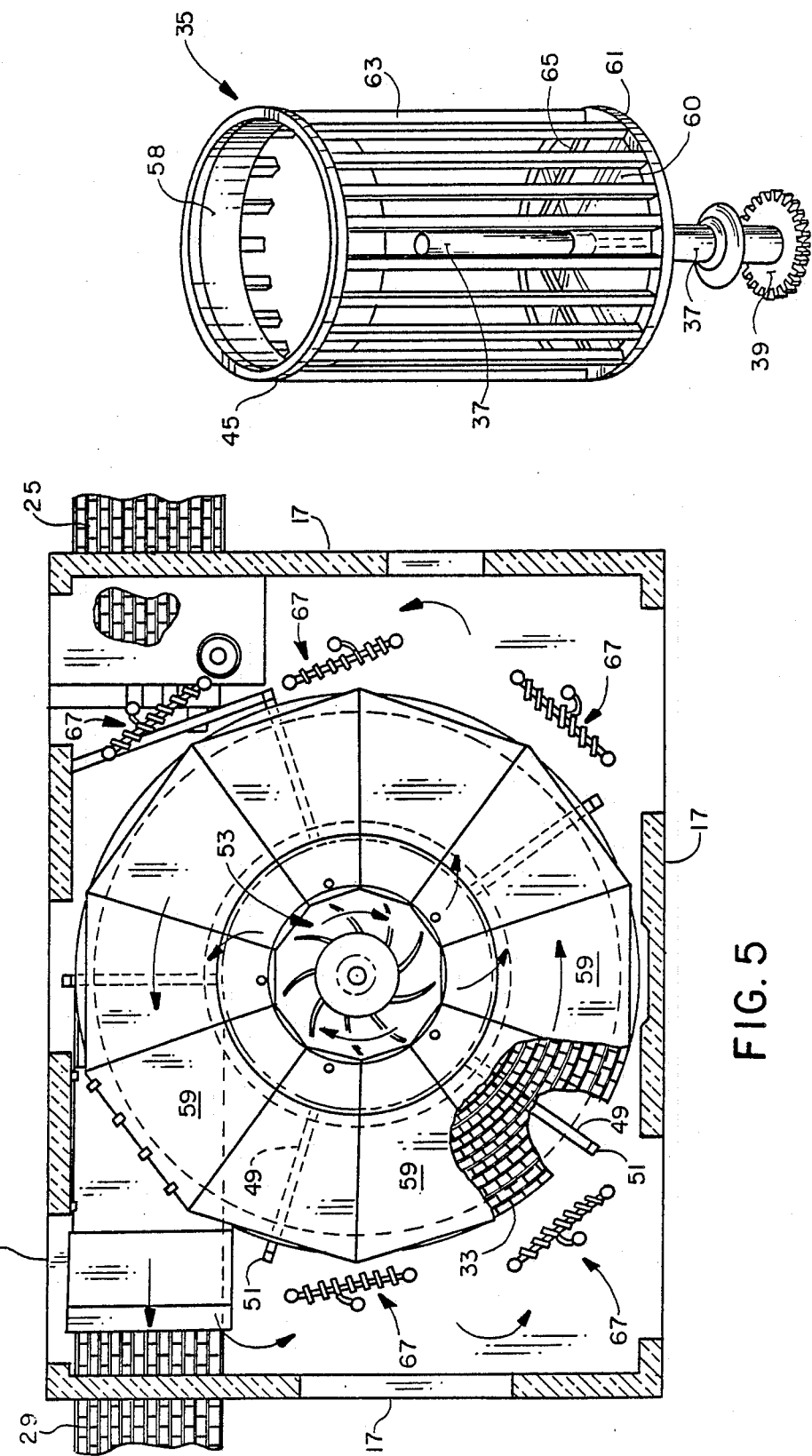

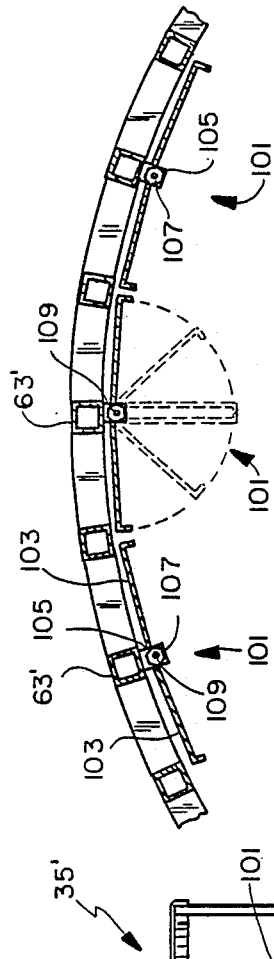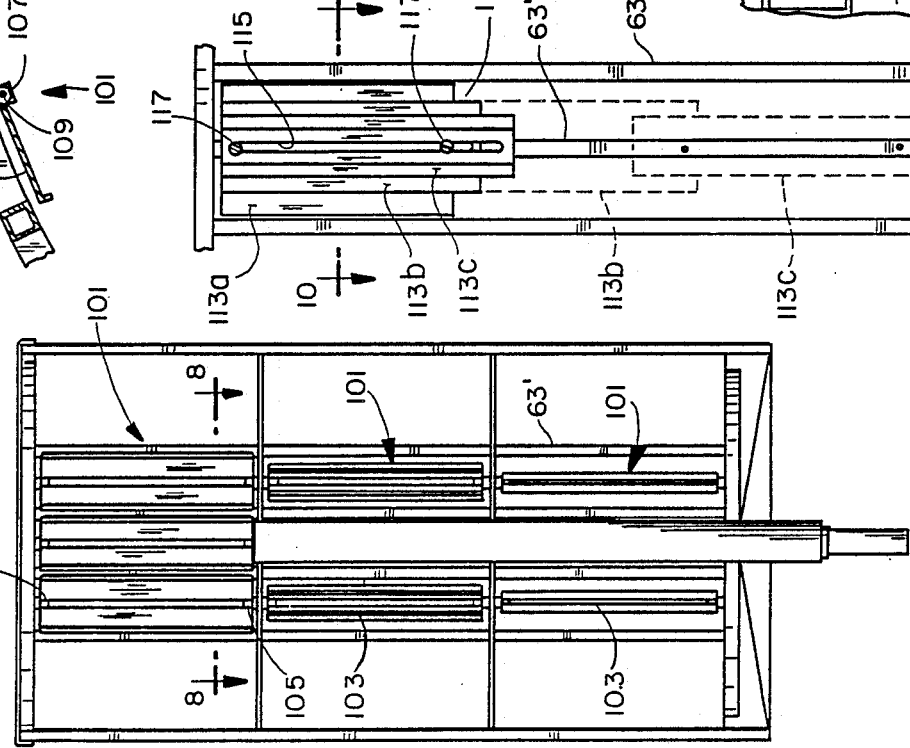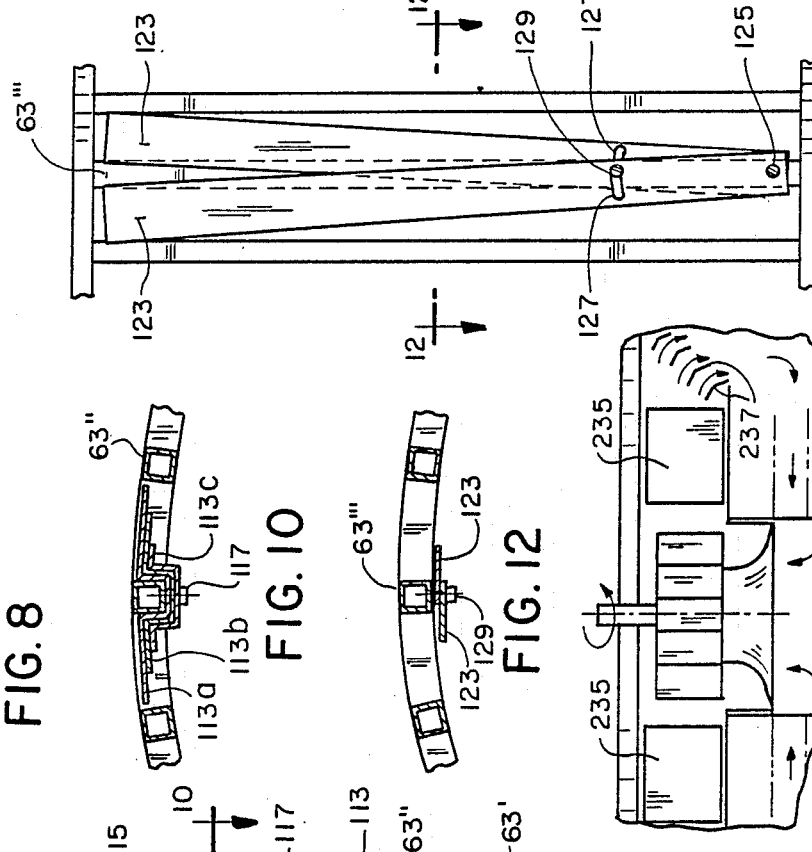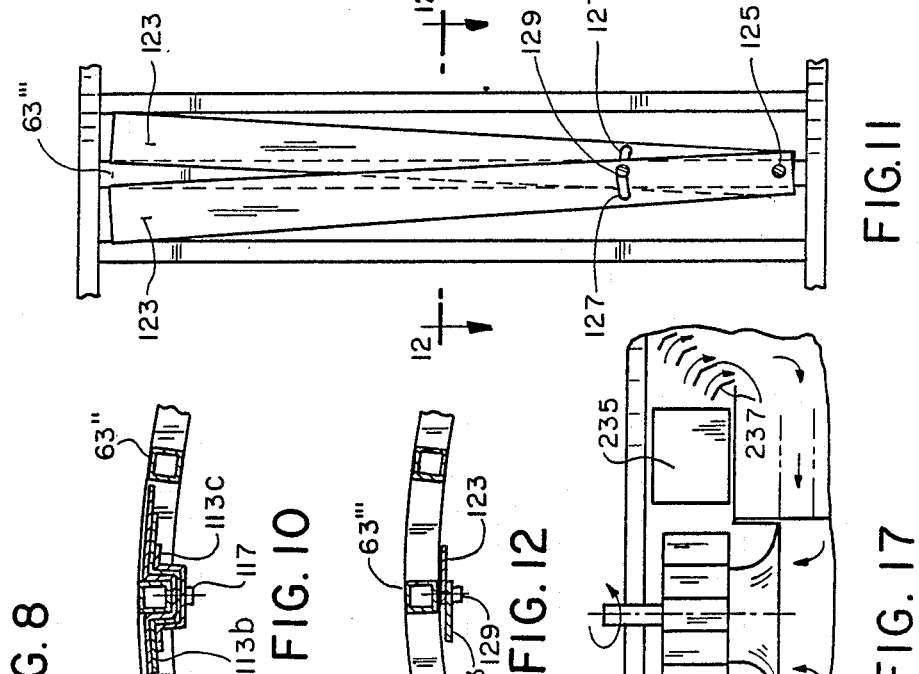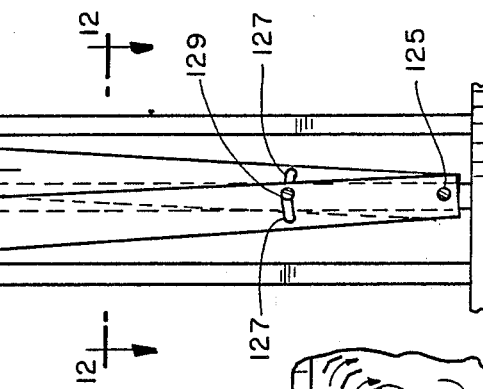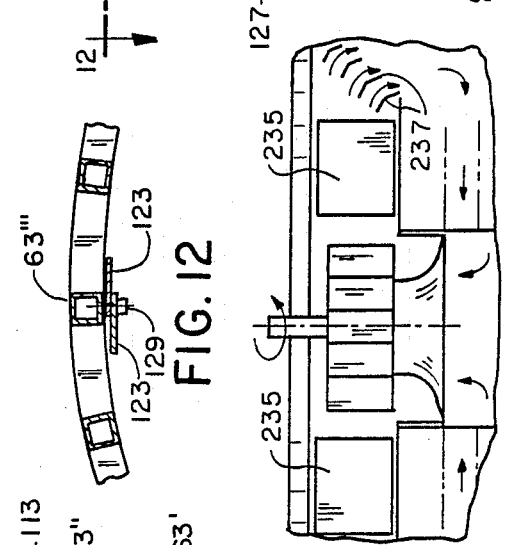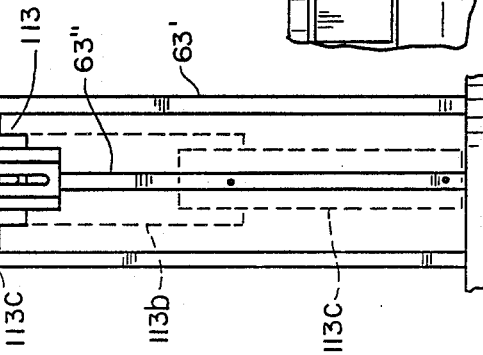

HELICAL CONVEYOR FREEZER

This invention relates to freezers wherein food products or the like are continuously conveyed through a freezing chamber, and more particularly to a food freezing apparatus wherein food products or the like are conveyed along a path defined by a helical conveyor section, which conveyor is at least partially driven by a rotating center cage.

BACKGROUND OF THE INVENTION

Freezers wherein a helical conveyor belt section is wound in tiers around a rotating cage, oftentimes termed "spiral freezers", have become commercially favored because a relatively long length of conveyor belt can be provided for freezing food products or other products while occupying a relatively small amount of floor space, particularly as compared to commercial tunnel freezers wherein a linear conveyor belt is employed.

Various different types of such spiral freezers have been developed. For example, U.S. Pat. No. 4,739,623 shows such a freezer wherein liquid nitrogen is sprayed or otherwise brought into contact with the food products at a lower location near the cabinet inlet, and the vapor is circulated generally horizontally past the food products being carried by the belt as they rise toward an upper outlet from the cabinet. U.S. Pat. No. 4,356,707, in FIGS. 10–12, shows a spiral freezer of this general type wherein $CO_2$ injectors are located in corner regions of the cabinet to inject $CO_2$ snow and cold vapor and induce additional vapor flow generally horizontally and in a direction concurrent with the movement of the food products along the helical path. U.S. Pat. No. 4,324,110 shows a cryogenic food freezer of this general type wherein liquid $CO_2$ is discharged countercurrently into streams of moving gas or vapor from fans to effect rapid vaporization of the injected $CO_2$. U.S. Pat. No. 3,733,848 shows a food freezer of this general type wherein spray nozzles inject $CO_2$ into discharge streams from vertically elongated blowers having vane-carrying squirrel cage rotors which rotate about vertical axes. U.S. Pat. No. 4,480,535 illustrates a food freezer of this general type wherein the pattern of gas flow within the freezer is primarily vertically through an open mesh or highly porous conveyor belt. U.S. Pat. No. 3,938,651 shows a freezer of similar construction wherein an interior cage is not driven but instead the conveyor belt itself is driven through an alternative linkage arrangement.

It is felt that freezing of food products is typically accomplished by heat transfer to the colder gas that is being circulated past the food products, although some heat may be withdrawn by removal to a vaporizing cryogen at its surface. Accordingly, the movement of the gas and its velocity become important to accomplishing efficient freezing of the food products. Likewise, the length of time during which the food products are exposed to the circulating cold gas is also important, and typically 10 or more tiers of belt are provided in the helical section.

In general, it has been found that the freezing of different food products presents different problems, and in order to accomplish the efficient freezing of different food products, it is often necessary to be able to make adjustments in gas flow and sometimes in overall time of exposure to the cold gas. Especially difficult freezing problems are presented by unwrapped and warm foods which tend to rapidly dehydrate until a solid envelope is created by the solidification of the surface, as for example, by the formation of an icy crust therealong. Likewise, the more rapidly surface solidification is accomplished, the less is the weight loss which occurs from the product and the fewer are the moisture or frost-related problems which must be compensated for within the freezer itself. However, once surface freezing has occurred, subsequent freezing becomes progressively more difficult because heat transfer must then be effected through the frozen skin, slowing the overall process.

As a result of the foregoing, it has been found that spiral freezers having a substantially uniform flow of air throughout the entire chamber, depending upon the character of the food products being frozen, will often have insufficient gas flow in one region, for example a lower region where initial freezing is occurring, and an excess of gas flow in another region, for example, an upper region wherein equilibration of final freezing is being accomplished. Moreover, the benefits achieved by overcoming such inefficiencies are much greater at colder freezer temperatures, i.e., when cryogenic or other freezers operating at temperatures of about −30° F. or below are concerned. In addition, it has been found that uniformity of cooling radially across the belt may be difficult to accomplish. U.S. Pat. No. 4,078,394 shows a spiral freezer wherein some effort was made to try to adjust the flow of cold gas through various regions by employing a driven center cage in the form of a drum of circular cross-section having both its axial ends open and having a varied perforation pattern in its sidewall wherein the holes along the bottom edge are the largest and progressively decrease in size to the smallest size at the upper edge. Gas is sucked from the interior of the drum by a motor-driven fan and is discharged past a plurality of cryogen injectors in the top wall of the freezer. Various inefficiencies result from such a freezer design, and accordingly, improved solutions to the foregoing problems continued to be sought.

SUMMARY OF THE INVENTION

One object of the present invention is to provide an improved spiral food freezer wherein more efficient freezing is achieved by means of improved regulation of gas flow past the food products being frozen. More particularly, by using the invention, it has been found possible to optimally freeze, with substantially increased efficiency, a wide variety of foods of the types being processed in modern food plants having different heat withdrawal characteristics.

Generally, the invention provides food freezers wherein a cage is mounted for rotation about a vertical axis within a thermally insulated enclosure and wherein there is an endless flexible conveyor belt, a main section of which is disposed helically about the cage and is driven by engagement along its inner edge with the cage. The belt has loading and unloading sections disposed adjacent an entrance and an exit, respectively, through which food products being frozen are introduced and removed from the enclosure. Preferably, one axial end of the cage is blocked to prevent gas flow therethrough, and a blower is located in communication with the other axial end to effect the circulation of gas within the enclosure by sucking gas from the interior of the cage and discharging it into the region generally between the interior wall of the enclosure and the helically disposed belt, thereby creating a generally radially inward flow of gas across the food products on the belt. By assuring that substantially the totality of forced gas flow is radially inward throughout the region of the freezer wherein the helical section of the belt is located, uniformity of temperature is achieved between food products located along the inner regions and along the outer regions of the belt at any particular vertical level in the helical section, which results in more efficient overall freezing.

The gas within the enclosure can be cooled by heat exchange with a coil containing a cold fluid, e.g., an evaporating liquid refrigerant, but significant further advantages are achieved by injecting a liquid cryogen radially inward so as to impinge upon the food products traveling along the helical section of the belt driven by the velocity of the radially inwardly flowing vapor. Particular efficiencies are obtained by precisely controlling the rate of radially inward air or vapor flow in different vertical regions to create a gradient of flow at different vertical levels of the helical belt section, because it is then possible to match the amount of refrigeration being supplied to the food products to their ability to accept cooling and in this manner to adapt a single freezer to achieve overall efficiency of operation when handling food products of differing characteristics.

BRIEF DESCRIPTION OF THE DRAWINGS

FIG. 5 is a plan view of the freezer of FIG. 1 with portions broken away to show details of the underlying structure;

FIG. 6 is a perspective view showing the rotating cage which is employed in the food freezer shown in FIG. 1;

FIG. 7 is a vertical sectional view showing the interior construction of an alternative version of the rotating cage depicted in FIG. 6;

FIG. 8 is an enlarged sectional view taken generally along the line 8—8 of FIG. 7;

FIG. 9 is a fragmentary sectional view, reduced in size, similar to FIG. 7 showing another alternative embodiment of a rotating cage;

FIG. 10 is a fragmentary sectional view enlarged in size taken generally along the line 10—10 of FIG. 9;

FIG. 11 is a view similar to FIG. 9 of still another alternative version of a rotating cage;

FIG. 12 is a sectional view taken along line 12—12 of FIG. 11.

FIG. 17 is a fragmentary schematic view generally similar to FIG. 13 showing an alternative construction.

DETAILED DESCRIPTION OF THE PREFERRED EMBODIMENTS

Figure 1:
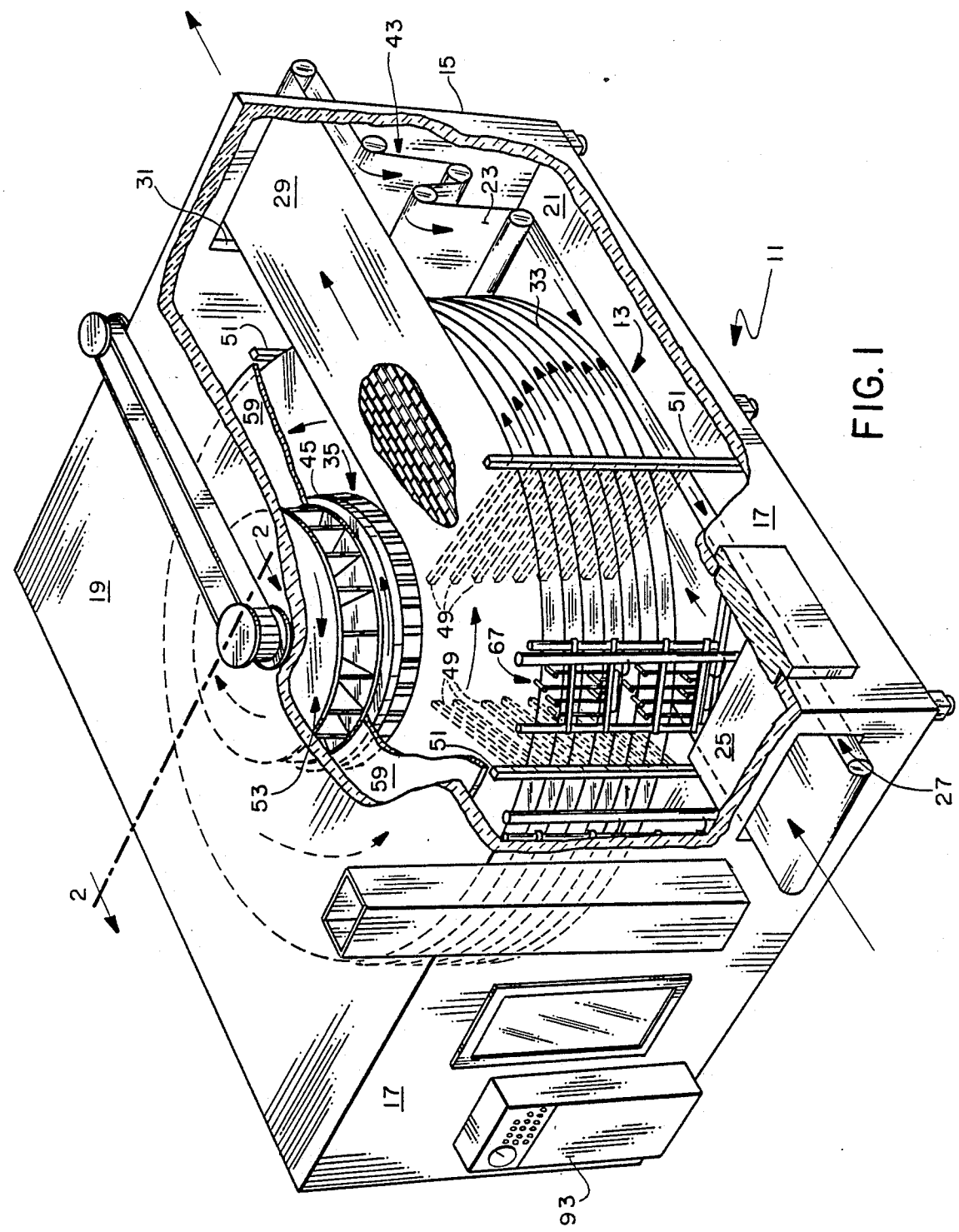
FIG. 1 is a perspective view of a cryogenic food freezer embodying various features of the present invention.

The invention provides a food freezer 11 which is designed to rapidly and particularly efficiently freeze food products or the like which move along a continuous conveyor 13 as they travel along a helical path which constitutes the major portion of the length of travel within an insulated cabinet or enclosure 15. Illustrated in FIGS. 1 through 6 is a freezer which includes a large insulated cabinet 15 generally in the form of a rectangular parallelepiped having four vertical walls 17, a top wall 19 and a bottom wall 21, all of which are suitably thermally insulated to maintain a low-temperature environment therewithin. Several doors and, if desired, a window are included to provide physical and visual access to the interior of the cabinet wherein an endless conveyor belt 23 of highly porous, i.e., open mesh, construction is located, as is well known in this art.

The conveyor includes such an endless belt 23, preferably made of stainless steel, which is arranged to have a short straight-line loading section 25 disposed near the bottom of the cabinet which may protrude a short distance through an entrance opening 27 in the cabinet enclosure and to also have a short, straight, unloading or exit section 29 that may also similarly extend a short distance through an upper exit opening 31 in the insulated wall of the enclosure. The conveyor can be of the type generally illustrated in U.S. Pat. No. 4,078,655, issued Mar. 14, 1978, the disclosure of which is incorporated herein by reference. The entrance and exit openings 27, 31 are generally aligned with each other and are at lower and upper corners of opposite walls of the enclosure. A main curved section 33 of the endless conveyor belt 23 lies between the straight loading and unloading sections and travels along a helical path in a plurality of flights or tiers about a center cage 35 which is drivingly rotated.

The cage 35 is preferably circular in horizontal cross-section, as seen in FIG. 5, although it might be oval or have some other generally circular shape. The rotatable cage is mounted on a composite center shaft assembly 37 which extends downward through the bottom wall 21 of the insulated enclosure; the shaft carries the usual bearings (not shown) and terminates in a sprocket or gear 39 which is preferably driven by a chain 40 that extends laterally to a drive motor (not shown) mounted adjacent the wall of the enclosure containing the exit opening 31, all as well known in this art. A tensioning motor is also preferably located near the exit and provides suitable low tension in the belt to assure that it remains in engagement, usually frictionally, with the exterior surface of the central rotating cage 35 which provides the primary motive power for the conveyor throughout nearly all of its length. A belt take-up arrangement 43 is also preferably provided inside the insulated cabinet 15, which compensates for the difference in the overall length of the belt 23 when the freezer is at ambient conditions and when the belt is in its shorter contracted state operating at temperatures below freezing.

As can best be seen in FIG. 1, the belt proceeds generally along the bottom wall of the enclosure to the entrance opening 27 where it extends outward for a short distance to constitute the loading section 25 where food products to be frozen are received. At the end of the straight-line loading section, the belt undergoes a transition to the curved orientation where it engages, usually frictionally, the outer surface of the rotating cage and begins its travel along a plurality of tiers, for example, nine or ten, as it proceeds gradually upward until finally undergoing a transition back to the straight-line unloading section 29. The rotating cage 35 is usually supported generally along its upper rim 45 by guide rollers or the like (not shown) mounted within the enclosure, and the individual tiers of the belt in its helical section 33 are supported by arms 49 at each vertical level which extend radially inward from a plurality of vertical posts 51 which extend between the top and bottom walls of the insulated enclosure 15.

The circulation of the gas or atmosphere within the insulated enclosure is effected by a large centrifugal blower 53, preferably one of those commercially referred to as a "Plug Fan", which includes a convolute entrance guide 55 that leads to the chamber wherein a vane-carrying wheel 57 rotates. The blower 53 is mounted coaxially with the rotating cage 35 at a location vertically thereabove. The entrance baffle 55 to the blower is preferably proportioned to provide clearance between it and the interior surface of the rotating cage which may have an imperforate sleeve 58 which depends from the upper rim 45 and prevents short circuit flow therethrough in the region of the entrance guide. Alternatively, the imperforate sleeve 58 could be provided as a depending portion of an overlying baffle that directs the discharge flow from the blower. The blower 53 takes its suction from the interior of the cage and discharges high pressure gas horizontally outward throughout 360. generally along the undersurface of the top insulated wall 19 of the enclosure and across a ring-shaped cover or baffle 59 that overlies the helical conveyor section. Whereas the upper end of the rotating cage 35 is in open communication with the blower, the lower or bottom end of the rotating cage is completely closed by a conical bottom wall 60 which is affixed at its upper end to the center shaft assembly 37.

Figure 2:
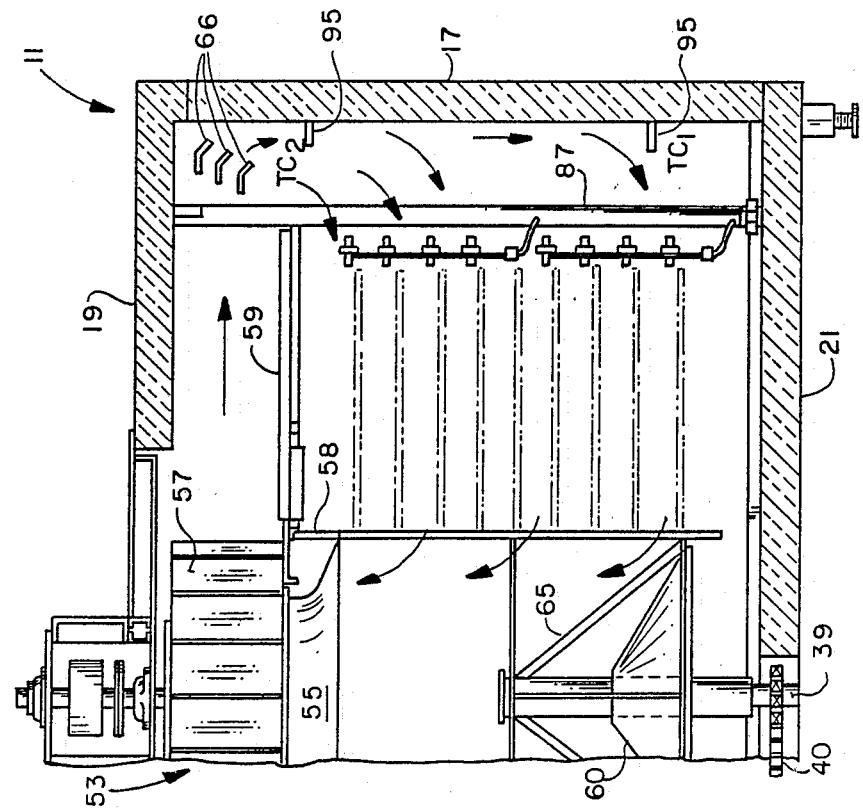
FIG. 2 is a vertical sectional view of a portion of the food freezer taken generally along the line 2—2 of FIG. 1.

As best seen in FIG. 6, the cage includes upper and lower rims or rings 45, 61 which are interconnected by a plurality of vertical bars 63 that are equidistantly spaced apart from one another and constitute the sidewall region of the cage. Struts 65 extending between the cage shaft assembly and the sidewall at the rim provide overall structural strength to the cage structure and stabilize the composite drive shaft assembly 37 therewithin. Inasmuch as the entire bottom of the cage is closed, the gas being sucked from the interior of the cage by the blower 53 comes through the spacing between the cage bars 63 in the sidewall, and the conical shape of the bottom wall assures an aerodynamically smooth flow pattern in the lowermost region of the cage. Thus, this arrangement creates a radial inflow of gas for essentially 360° throughout the sidewall of the cage and subjects the food products carried by the belt in the helical section 33 to heat transfer to such radial inflow of cold gas. To complete the overall generally toroidal circulation pattern, the gas being discharged horizontally from the blower travels toward and then down along the four vertical walls 17 of the enclosure along which it flows until it begins its radial inward path through the conveyor. The gas flow is assisted in turning downward by a plurality of turning vanes 66 (FIG. 2).

Figure 4:
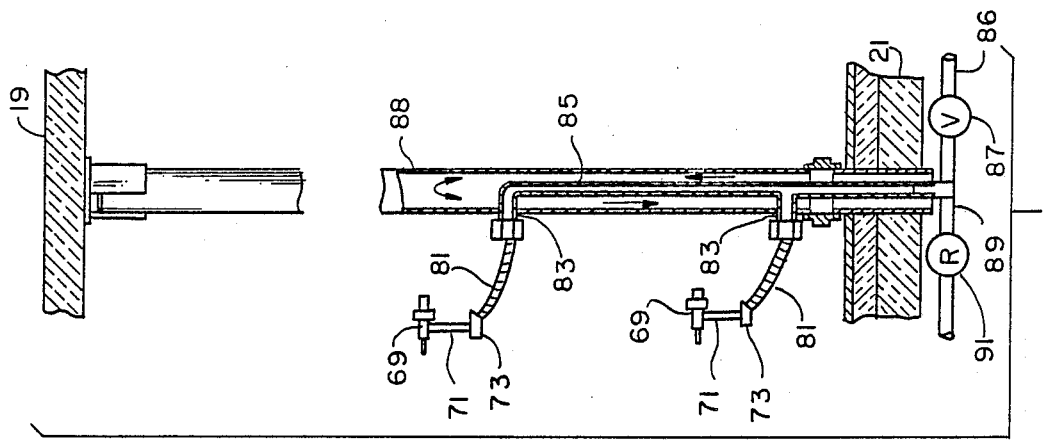
FIG. 4 is a vertical sectional view, enlarged in size, taken along the line 4—4 of FIG. 3.
Figure 3:
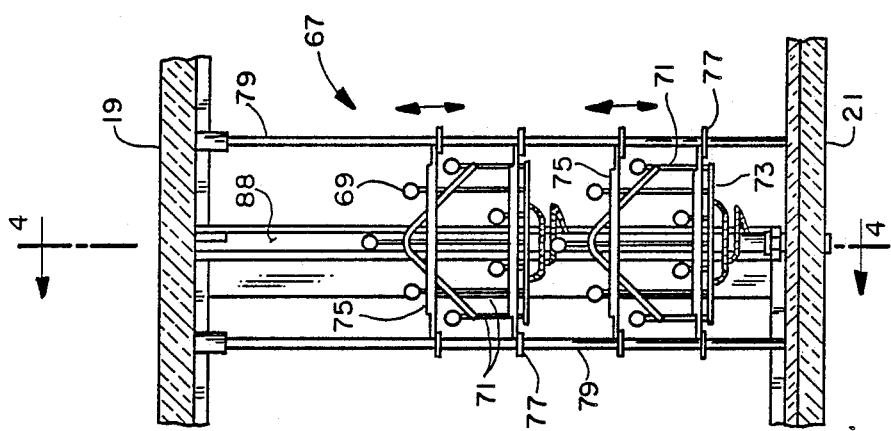
FIG. 3 is a fragmentary elevational view showing the cryogen injection apparatus taken looking generally along the line 3—3 of FIG. 2.

As explained in more detail hereinafter, the cooling for the gas can be provided through a standard type of coil wherein a cold liquid or an evaporating refrigerant is circulated so as to absorb heat from the atmosphere; however, there are particular advantages that result from injecting a liquid cryogen into the radially inward gaseous flow so that it travels concurrently with the flow of gas and impinges upon the food products being carried on the helical section 33 of the conveyor. As illustrated in FIG. 5, the freezer 11 contains five separate banks or sets of arrays 67 of spray nozzles 69. As best seen in FIG. 3, each array includes seven spring-loaded spray nozzles each connected via a vertical header tube 71 to a horizontal manifold 73. A vertically adjustable bracket assembly 75 is provided which is mechanically interconnected, as by welding or the like, with each of the vertical headers 71, and each bracket assembly includes four split-collar assemblies 77 which are slideably received upon a pair of vertical rods 79 of circular cross-section that extend from the bottom wall to the top wall of the enclosure and allow the nozzle array to be adjusted to an appropriate vertical level where the radially inward cryogen sprays from the nozzles 69 will impinge against food products on four different tiers of the helical conveyor section. A flexible conduit 81 is employed to interconnect each manifold 73 to a slightly lower outlet 83 on a permanently mounted vertical standpipe 85 extending upward through the insulated floor 21 of the enclosure, which standpipe contains a plurality of side outlets 83, as best seen in FIG. 4. As a result, each standpipe supplies liquid cryogen upward to at least two arrays 67 of spray nozzles.

The illustrated arrangement is particularly designed for use with liquid $CO_2$ which is supplied via a liquid $CO_2$ line 86 through a flow control means or valve 87 (FIG. 4) that controls the downstream pressure and the rate of flow therethrough by modulating, in response to the demand for refrigeration as discussed hereinafter. For the injection of $CO_2$ snow, the spray nozzles 69 preferably have spring-loaded stem arrangements set to open at a supply pressure of about 125 psig or higher and preferably at a pressure of at least about 200 psig. When injected into an environment at about atmospheric pressure, liquid $CO_2$ is transformed to a mixture of $CO_2$ snow and cold $CO_2$ vapor, and the snow impinges against the food products being carried on the continuously moving conveyor belt. It is possible that liquid $CO_2$, at pressures between about 125 psig and about 300 psig, may freeze to solid $CO_2$ in a cold environment; it is also possible that minor amounts of solid $CO_2$ will form in a flowing stream of liquid $CO_2$ as a result of momentary pressure drops, which solid $CO_2$ will be carried along to a nozzle orifice where it will accumulate and can cause clogging. It has been found that by surrounding each of the liquid cryogen standpipes 85 with a coaxial riser tube 88 that extends upward through the bottom wall of the insulated enclosure and is thereby open to ambient conditions below the freezer, a positive deterrent to such freezing is provided. Because the annular region between the riser tube 88 and the $CO_2$ standpipe 85 is open to the atmosphere at its bottom, a natural convection flow of ambient air upward and downward through this region is created which warms the cryogen feed pipe sufficiently to prevent any such freezing.

In addition, the piping is arranged so that the flow path from the liquid flow control valve 87 is either horizontal or upward to the individual spray nozzles (having no downward oriented sections behind which vapor could be trapped), and a connection is provided to a vapor line 89, which is conveniently made to the bottom end of each $CO_2$ standpipe 85 adjacent its connection to the high pressure liquid $CO_2$ line 86, preferably just downstream from the control valve 87. The vapor pressure in the line 89 should be above the triple point pressure of $CO_2$, i.e., 75 psia, and preferably, at a pressure of at least about 150 psig, so as to assure that the pressure in the standpipe 85 and the associated piping to the spray nozzles is maintained above the triple point pressure; however, it is preferably below the pressure at which the spring-loaded spray nozzles are set to open. For example, $CO_2$ vapor, at about 160 psig, reduced from the usual storage vessel pressure of 300 psig by a pressure regulator 91, may be provided when the spray nozzles are set to open at about 200 psig. During normal operation, the reduction in pressure at the flow control valve 87 results in the creation of $CO_2$ vapor which travels with the flowing liquid; $CO_2$ solids that are formed, as mentioned above, and carried to the orifices of the spray nozzles can result in momentary clogging. If clogging occurs, $CO_2$ vapor bubbles will travel upward through the liquid $CO_2$ in the vertical standpipe and in the associated array of spray nozzles to the blocked orifice where the vapor will melt any solid $CO_2$ to create liquid $CO_2$, removing the blockage. Whenever the control valve 87 is shut, the connection to the line 89 assures a minimum pressure of at least about 160 psig is maintained upstream of the spray nozzles. If the freezer is to be shut down for a period of time, nothing further need be done. As the freezer is allowed to warm up, the remaining liquid $CO_2$ in the standpipe and in the piping downstream of the control valve 87 will slowly vaporize, and when the pressure exceeds the setting of the spring-loaded spray nozzles, one or more of them will open slowly venting $CO_2$ vapor into the freezer until all of the liquid $CO_2$ has vaporized.

When such a cryogenic food freezer employs liquid $CO_2$ as the cryogen, the arrangement is generally such that liquid $CO_2$ will be fed simultaneously to the spray nozzles 69 of all of the banks of arrays in the five different locations depicted in FIG. 5. Control would normally be via a control system 93, mounted as a part of a panel which would monitor the temperature within the enclosure 15 and, by causing the control valve 87 to modulate, thereby adjust the flow rate of liquid $CO_2$ therethrough being fed to the injectors so as to maintain the gas temperature in the freezer within a desired range. It will, of course, be realized that the gas temperature will vary somewhat depending upon where it is measured within the enclosure inasmuch as gas warms as it passes over the food products and, of course, cools when it intermingles with the cold vapor that is being generated along with the $CO_2$ snow being injected from the spray nozzles. It is generally accepted that a representative temperature reading in freezers of this general type is obtained by measuring the temperature at one or more locations in a vapor section relatively isolated from the injected cryogen. Accordingly, a pair of thermocouples 95 or other suitable temperature-measuring devices are provided at appropriate locations within the freezer, for example, along one vertical wall 17 about one-third of the distance downward from the top and upward from the bottom as depicted in FIG. 2, which send signals to the control system 93 that are used to accordingly modulate the injection flow of liquid $CO_2$ through the spray nozzles -- usually by both altering the downstream pressure of liquid $CO_2$ exiting the pressure-regulating valve 87 and the rate of flow through the valve. Preferably, a plurality of thermocouples or other temperature sensors 95 are provided within the freezer, and the signals from these are averaged to control the temperature within the freezer.

As an example of the efficiency of a freezer of this general design, tests are run with a freezer having about 230 feet of conveyor belt, which includes the loading section 25, the main helical section 33 and the unloading section 29. Liquid carbon dioxide is supplied to the arrays of spray nozzles so as to impinge $CO_2$ snow upon chicken nuggets, which are discrete, compressed, cooked, composite pieces of chicken about one inch in greatest dimension. The belt is about 34 inches wide and is operated at a lineal speed of about 16 feet per minute. As such, over a dwell period of about 14-16 minutes, the freezer is able to freeze the entire output from two nugget-forming machines, which together supply about 3400 pounds of chicken nuggets per hour to the freezer. The chicken nuggets being supplied are coated with a batter and breading and, following immersion frying, are at a temperature of about 180° F. when deposited on the loading section of the conveyor. The efficiency of the freezer is such that, by maintaining a gas atmosphere temperature of about −40° F. within the freezer, it is found that the chicken nuggets are acceptably uniformly frozen across the width of the belt. Examination of individual nuggets shows that innermost regions have hardened and the outer regions have not been cooled lower than necessary when they reach the unloading section of the conveyor. Calculations show that, by delivering about 5690 pounds per hour of liquid $CO_2$ (at about 0° F. and 300 psig) to the freezer, freezing of about 3400 pounds per hour of chicken nuggets to an equilibrated temperature of about 10° F. is achieved. The liquid control valve 87 modulates both the pressure and the flow rate of the liquid $CO_2$ supplied to the standpipe, and the use of injectors 69 having spring-loaded conical stems which function to create orifices of variable areas results in the injection of cryogen into the freezer at a substantially greater rate at higher liquid $CO_2$ pressures. The control is such that, should a temperature be reached within the freezer above the desired temperature range, supply of cryogen through the injectors 69 may be momentarily halted; however, during normal operations, the controlled flow of $CO_2$ liquid keeps the temperature within the desired range. As mentioned, any blockages at the injectors are self-clearing because the design causes $CO_2$ vapor to migrate to the site and melt the solid $CO_2$ causing the blockage. The results evidence a very efficient freezing process compared to what has heretofore been the standard carbon dioxide spiral food freezer wherein a slightly longer conveyor belt was employed at a temperature of about −90° F. in order to handle the output from only one nugget-forming machine.

Very generally, the most frequent use of such spiral freezers is for the freezing of unwrapped food products delivered to the freezer from complex processing or fabrication lines in order to effect freezing of the food products prior to their packaging. Depending upon the particular plant of the food manufacturer, the ultimate packaging will take place in a room that may be somewhere between about ambient and about 40° F., which would result in some defrosting of the just-frozen food during packaging. For this reason, food products which have been frozen so as to have an extremely cold outer surface and a warmer interior surface would tend to lose more "refrigeration" to the surroundings during packaging than food products being more uniformly frozen which have a surface temperature of about 0° F. — a target temperature when substantial equilibration throughout the food product is achieved during the freezing process. As a result, it has been found that a particularly efficient overall freezing and packaging arrangement operates by supplying "refrigeration" to the food products as rapidly as possible and thereafter maintaining such products in an environment where the food product equilibrates in order that a lesser temperature differential will exist between the skin temperature and the frozen center of the food product. In this manner, the food products are eventually frozen substantially all the way through their centers without having an overly cold exterior surface when leaving the freezer. As indicated above, such an overly cold outer surface is undesirable and results in overall inefficiency because that surface will tend to more rapidly absorb surrounding heat and thus significantly negate the value of having expended additional cryogen to lower its temperature to such a point.

It has been found that, by modifying the structure of the rotating cage 35, vertical gradients can be achieved between the amounts of radially inward flow of cold vapor occurring in the lower region of the freezer as compared to that occurring in the upper region where such an equilibration effect is desired. Because each food product has its own individual characteristics for being able to accept refrigeration, it is considered important in order to achieve truly efficient operation, to be able to adjust the rates of radially inward gas flow between the upper and lower regions of the helical conveyor section in order to closely match that particular food product's freezing characteristics. It has been found that one way appropriate adjustability can be effectively built into a spiral freezer of this type is by mounting adjustable baffle means in association with the interior surface of the sidewall of the rotating center cage.

Depicted in FIGS. 7 and 8 is a preferred alternative embodiment of a center cage 35' wherein an adjustable restrictor unit 101 is mounted on the interior surface of every other one of the vertical cage bars 63'. Each restrictor unit 101 includes a pair of plate-like restrictors 103 which are sufficiently wide to effectively span the distance between adjacent cage bars 63', as best seen in FIG. 8. Upper and lower mounting brackets 105 are suitably affixed, as by welding, to the interior surface of each cage bar, and mounting clips 107 are suitably affixed to the upper and lower edges of the short inner flange sections of the plate-like restrictors 103. Such clips 107 have suitable holes which are aligned with holes of the same size in the mounting brackets 105 and allow lock nut and bolt combinations 109 to be used to mount each restrictor unit. As can be seen from FIG. 8, each pair of the restrictors is pivotable about an axis defined by the mounting bolts, and they can be adjusted so as to exert anywhere between an almost complete blocking effect to inward gas flow and essentially no blocking effect. Once set in the desired angular orientation, tightening of the lock nuts will maintain this orientation during the subsequent freezing operations.

As seen in FIG. 7, the cage 35' is divided into three vertical sectors, and each of the restrictor units 101 has a height equal to about one-third of the vertical height of the cage. By segmenting the restrictor units in this fashion, provision is made for creating adjustable gradients of radially inward gas flow within the three different vertical sectors of the helical belt section. For example, the lowermost sector of baffles or restrictors 103 can be adjusted so that they are in the nearly completely open position so as to allow a fairly high rate of radially inward cold gas flow in this region, whereas the uppermost sector may be set so as to fairly completely block the passageways between adjacent cage bars so as to allow only a relatively low rate of gas flow in this region. With such an arrangement, it would be usual to set the restrictor units 101 in the central vertical sector at a more or less intermediate angular orientation so as to permit an intermediate rate of gas flow to occur in this region. The use of such an overall arrangement in a food freezer provides for efficiency in creating an environment near the upper portion of the freezer wherein the desired equilibration will take place which, as described hereinbefore, results in overall greater efficiency of the freezing process. Moreover, should it be certain that the freezer will be dedicated to freezing food products for which it is desired to maximize the amount of refrigeration that is initially applied, the adjustable restrictors could be omitted from the lowermost sector so as to maximize radially inward cold gas flow in this region where the initial freezing is occurring.

Depicted in FIGS. 9 and 10 is an alternative arrangement wherein flow restrictors or baffles 113 are slideably mounted on alternating cage bars 63" which are sized to extend laterally outward and occupy substantially all or a portion of the otherwise open area adjacent the cage bar on which they are mounted and the next adjacent cage bar on each side. For example, as shown in FIG. 9, the restrictors could be formed with a central channel that matches the exterior dimensions of the bar 63" and slideably fits thereupon, and each has an elongated slot 115 extending vertically therewithin along its centerline that allows it to be vertically adjusted along the interior surface of the cage bar. The restrictors 113 could be made in three or more pieces or sections, labeled 113a, b and c, and they could be mounted in place by one or more bolts 117 extending through the elongated slots 115 into a series of threaded holes in the interior wall of the cage bar. The individual sections should fit together in telescopic arrangement with one another, sliding along the interior surface of the bars 63" and permitting the vertical distances over which the radially inward gas flow gradients will occur to be appropriately adjusted as desired, e.g., as by extending the restrictors 113 to their maximum length or compressing them to their shortest length by sliding them closer together.

Depicted in FIGS. 11 and 12 is still another alternative arrangement where restrictor or baffle plates 123 are provided and mounted in pairs to the rear surface of every other cage bar 63", by a lower bolt 125 about which they can pivot. In the embodiment illustrated, each restrictor plate 123 has a width just slightly wider than the cage bar and may be mounted with the pivot point at a location about midway between the top and bottom of the rotating cage and extends upward to the top of the cage. Each plate has a second slightly arcuate, laterally extending slot 127 at a slightly higher location which allows the two plates to be spread or fanned in opposite directions and locked in this position by tightening an upper bolt 129 so as to provide a V-shaped overall restriction that will exert a maximum blocking effect on the radially inward flow of gas at the top of the cage and only a minimal blocking effect in the region near the lower pivot point. In such an arrangement, it will be understood that there will be a gradual gradient of flow, with greatest flow occurring in the region defined by the lower ends of the restrictors 23 and getting progressively less upward to the top of the cage.

Figure 13:
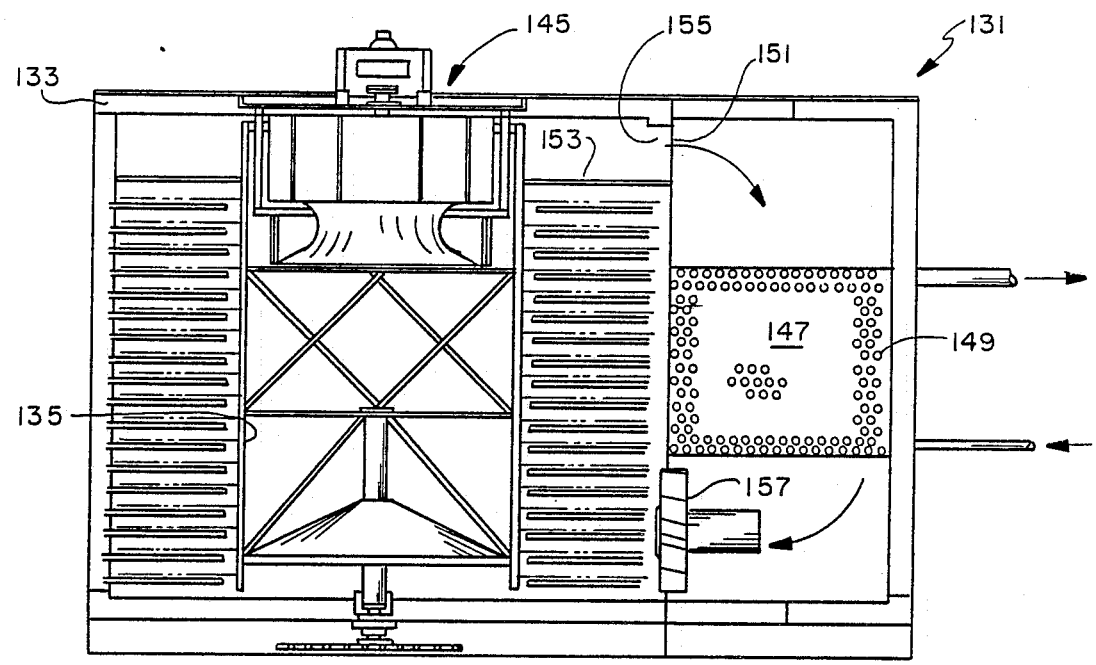
FIG. 13 is a vertical sectional view through an alternative version of a food freezer embodying various features of the invention.
Figure 14:
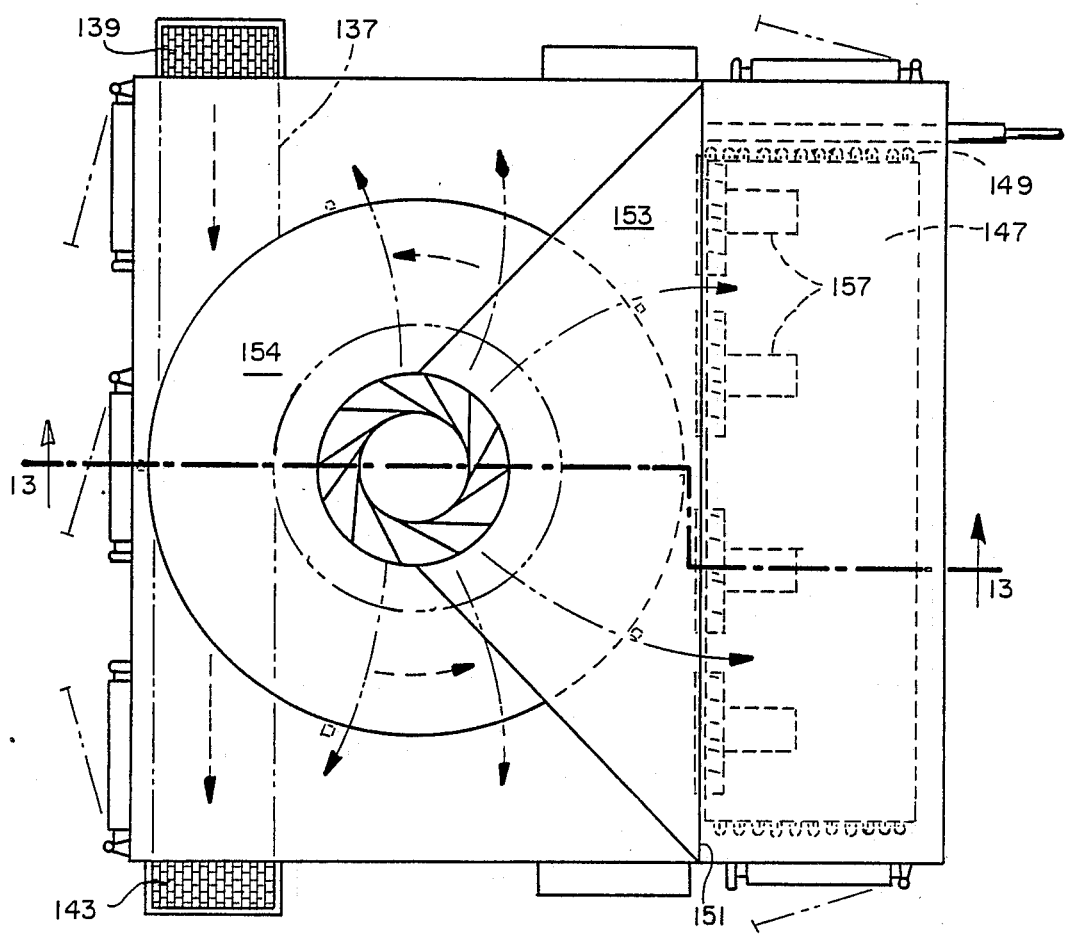
FIG. 14 is a plan view of the freezer of FIG. 13.

Although as earlier indicated there are particular advantages to the invention when it is employed in a freezer wherein liquid cryogen is directly injected so as to impinge sharply upon the food products aided by the velocity of radial inward flow of vapor, the overall arrangement can also be utilized for mechanical freezers. Depicted in FIGS. 13 and 14 is a mechanical freezer arrangement 131 wherein an insulated freezer enclosure 133 is provided generally similar to that previously described wherein a rotating center cage 135 similarly drives an endless conveyor belt 137 arranged to travel from a lower, straight-line loading section 139, through a main helical section 141 to an uppermost unloading section 143. The freezing of food products on the belt is carried out as a result of heat exchange with the cold gas being circulated primarily by an axially located blower 145 mounted at the upper end of the cage.

In this embodiment, the insulated enclosure 133 is extended in one direction, preferably at its side opposite from the wall along which the entrance and exit are located, to create an ancillary chamber 147 wherein an extended surface cooling coil 149 is provided. The ancillary chamber is formed by a vertical wall 151 equal in height to about the height of the helical section of the conveyor, which wall is connected at its top to a generally trapezoidal baffle 153 which extends horizontally inward to the blower, as is best seen in FIG. 14, which is joined to an annular baffle 154 covering the remainder of the upper region above the helical conveyor section. This arrangement leaves a passageway 155 between the undersurface of the top wall of the enclosure and the baffle 153 through which approximately one quadrant of the discharge from the blower 145 is directed into the ancillary chamber 147. Four auxiliary fans 157 are located adjacent circular openings in this wall 151 below the heat exchange coil. These four fans 157 include electric motors which drive them to suck the gas traveling through the upper passageway 155 downward through the coil 149 cooling it by heat exchange with the cold refrigerant therewithin and then discharging it into the main portion of the freezer where it travels radially inward through the helical conveyor section 141 where it mixes together with the gas streams from the other three quadrants of the blower discharge when these streams return to the interior of the rotating cage 135.

Any suitable refrigerant can be circulated through the coils, for example, a cold liquid or a subcooled liquefied gas which gives up its sensible heat to the gas being circulated therepast; alternatively it can be a liquefied refrigerant, such as ammonia, a halogenated fluorocarbon or the like, which evaporates in the coil, as is well known in mechanical refrigeration arrangements. When a vaporizing cryogen is not used in the freezer to provide cooling, the gas being circulated will normally be air. The rotating center cage 135 is constructed in essentially the same manner as previously described, and one of the adjustable restrictor arrangements is included so as to create gradients in the inward flow of the gas atmosphere through the helical belt section 141 from the top to the bottom thereof, as explained hereinbefore. It can be seen that many of the advantages previously described with respect to achieving efficient freezing by being able to match refrigeration to the ability of the food products to accept it are also features of the freezer 131.

Figure 15:
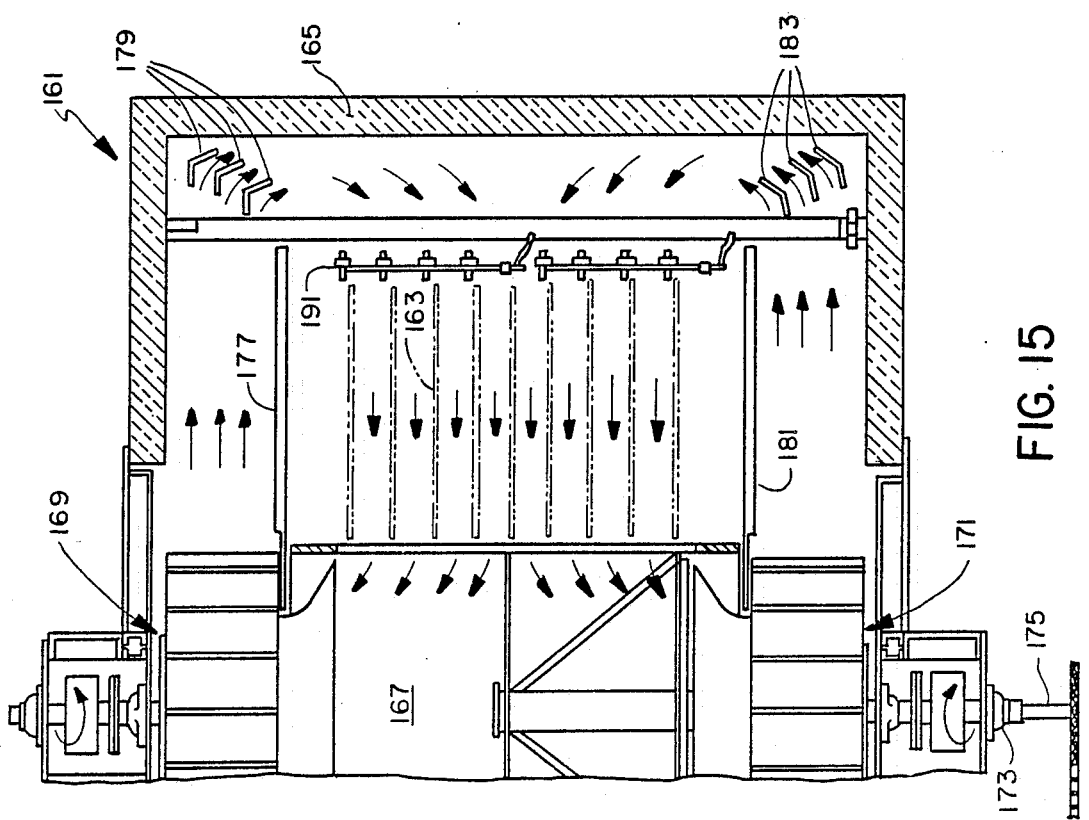
FIG. 15 is a vertical sectional view through another alternative version of a food freezer embodying various features of the invention.

Depicted in FIG. 15 is a schematic view of another alternative embodiment of a food freezer 161 which includes an endless conveyor having a helical conveyor section 163 located within an insulated enclosure 165. A rotating center cage 167 is similarly used to drive the endless conveyor belt, and an axially located blower 169 is again mounted at the upper end of the rotating cage. However, in this embodiment, instead of plugging the bottom end of the rotating cage 167, a second axially located blower 171 is mounted at the lower end of the cage which is suitably driven as via a hollow shaft 173. The hollow shaft allows a concentric inner shaft 175 to be employed, which extends upward therethrough, to appropriately drive the rotating cage 167, in a manner as explained generally hereinbefore.

A baffle arrangement 177, similar to that described to hereinbefore, is provided above the helical conveyor section 163 so as to direct the discharge from the blower 169 outward to a set of turning blades 179 and then downward along the vertical walls of the enclosure 165, as explained hereinbefore. A similar baffle 181 is located below the helical conveyor section to direct the discharge from the lower axial blower 171 outward to a set of turning blades 183 and then upward along the vertical walls of the enclosure 165. By regulating the speed at which the lower blower 171 is driven, as compared to the speed at which the upper blower 169 is driven, a gradient of radially inward flow of the gaseous atmosphere can be accomplished between the regions at the lower level of the helical conveyor section 163 and the regions near the top of the helical conveyor section. For example, by driving the lower blower 171 at a substantially faster speed than the upper blower 169, a substantially greater radial inward flow of gas is created near the lower end of the helical section, and a suitable control means (not shown) is provided to allow the blowers 169 and 171 to be driven at the same or different speeds, as desired, with either driven faster than the other so as to discharge a greater quantity of gas radially outward therefrom. As explained hereinbefore, it would generally be desirable to have a greater radially inward flow rate of gas in the region where the food products are at their warmest. If for freezing or chilling a particular product, such flow gradients are not desired, both of the blowers could be run at the same speed. Such an arrangement could be used with either cryogenic cooling via an array of spray nozzles 191 or with mechanical refrigeration where a working refrigerant circulates within a closed loop.

Figure 16:
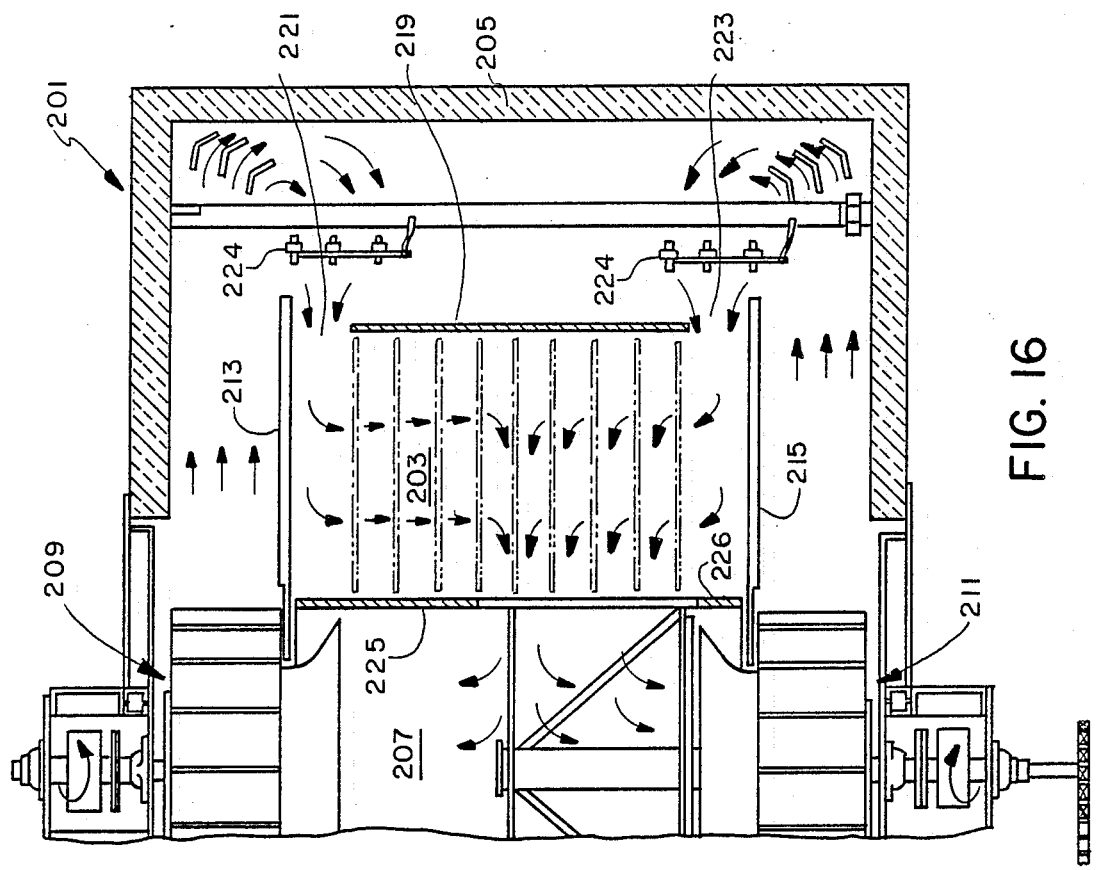
FIG. 16 is a vertical sectional view through still another alternative version of a food freezer embodying various features of the invention.

Depicted in FIG. 16 is still another embodiment of a food freezer 201 which bears some resemblance to the food freezer depicted in FIG. 15. Illustrated is a food freezer 201 wherein the helical section 203 of an endless conveyor belt is located within an insulated enclosure 205 and is driven by a rotating cage 207. Again, an upper, axially located blower 209 and a lower, axially located blower 211 are provided, along with associated annular baffles 213 and 215. However, in this arrangement, an outer cylindrical sleeve 219 totally surrounds the exterior of the helical conveyor section 203 to prevent radial flow directly through the periphery of the helical conveyor region. As a result, the flows from the 360° discharges from both blowers respectively enter into the helical region through an upper annular passageway 221 and a lower annular passageway 223 (which are provided between the sleeve 219 and the top and bottom baffles 213, 215) and proceed from these passageways generally vertically through the porous conveyor belt as well as radially inward. Arrays 224 of spray nozzles are located to spray cryogen into the passageways 221 and 223. Either the upper annular baffle includes a depending section or extension which extends downward adjacent the interior surface of the upper end of the rotating cage 207 or an imperforate baffle 225 is incorporated into the upper region of the cage 207 to allow only essentially vertical flow of gas in this region. If desired, a similar extension could be added to the lower baffle 215 or a short baffle incorporated into the lower region of the cage 207 so as to alter the flow pattern slightly to achieve a slightly greater amount of radially inward flow in the central region of the helical conveyor section 203. Again, by driving the lower blower 211 at a higher speed than the upper blower 209, a substantially greater flow of the gaseous atmosphere can be achieved in a lower region of the helical conveyor section 203.

Although the invention has been described with regard to certain preferred embodiments, it should be understood that various changes and modifications as would be obvious to one having the ordinary skill in this art may be made without departing from the scope of the invention which is defined in the claims appended hereto. For example, instead of locating the coil for a mechanical refrigeration arrangement in a separate auxiliary chamber, as depicted schematically in FIG. 17, an annular coil arrangement 235 in one or more sections could be located in the region immediately outward of the blower discharge in total surrounding relationship thereto or on three sides other than in the region of the unloading section of the conveyor. The cooled gas exiting from the annular coil 235 is directed downward to the periphery of the helical conveyor section by sets of turning blades 237. Should it be desired to lower the overall height of the freezer, the plug fan blower could be recessed slightly to a location partially within the upper region of the rotating cage, relying upon the open mesh character of the conveyor belt material to permit downward gas flow through the uppermost regions of the helical section located immediately exterior of the recessed portion of such a plug fan. In such an arrangement, it might be desired to reduce the diameter of the upper baffle slightly so as to facilitate the desired amount of downward gas flow through the open mesh conveyor belt in this uppermost region. Individual inducers, such as are disclosed in U.S. Pat. No. 4,356,707, could be provided adjacent the spray nozzles to supplement the flow of gas in certain regions where it might be desired to create a still higher rate of flow of gas. Although slightly higher temperatures might be employed, particularly in freezers using mechanical cooling, generally a temperature at least as low as about −30° F. is used, and lower temperatures may often be employed in cryogenic freezers. Instead of providing adjustable baffling arrangements such as those shown in FIGS. 9 and 11, several sets of interchangeable baffles might be provided, which could be substituted one set for another via the use of quick-disconnect fittings, to achieve the equivalent effect. Even though the apparatus is expected to find its primary commercial use as a freezer for food products and, as such, it has been so referred to hereinbefore, it should be understood that it can be employed to significantly lower the temperature or chill any products and that the term is used to broadly describe apparatus capable of such use and is not intended to be limiting of the apparatus.

Particular features of the invention are set forth in the claims that follow.

What is claimed is:

1. A cryogenic food freezer comprising
   a thermally insulated enclosure,
   a cage located within said enclosure mounted for rotation above a vertical axis, said cage being of generally circular cross-section and having a generally open sidewall formed of a plurality of generally vertically extending members,
   means for rotating said cage about its vertical axis,
   an endless flexible conveyor belt within said enclosure and disposed helically about said cage in engagement along its inner edge with said cage, said belt also having loading and unloading sections,
   said enclosure having entrance means and exit means through which food products being frozen can be introduced and removed,
   blower means in communication with one axial end of said cage for circulating gas within said enclosure to withdraw heat from food products being frozen, said blower means being located to such gas from the interior of said cage and means at the other axial end of said cage preventing gas flow therethrough toward said blower means, so that high pressure gas is directed into a region generally between the interior wall of said enclosure and said helically disposed belt, from which a generally radially inward gas flow is created across the food products being carried on said helical belt, and
   refrigeration means for cooling the gas within said enclosure to a temperature of about −30° F. or below, said refrigeration means comprising cryogen injection means positioned to inject liquid cryogen radially inward so that said injection cryogen impinges upon food products carried on and positioned across the width of said helical belt aided by said radially inward concurrent gas flow and also cools the gas.

2. A food freezer according to claim 1 wherein said cryogen injection means is located in a lower one-half of said enclosure, wherein said blower means is a centrifugal blower mounted in axial alignment at the upper end of said cage and in an orientation to discharge gas radially outward in a substantially 360° path near the top of said enclosure, wherein the lower end of said cage is blocked to gas flow therethrough and wherein said entrance means is located vertically below said exit means as belt travels upward throughout the helical section of said belt.

3. A food freezer according to claim 2 wherein said cryogen injection means includes a plurality of spray nozzles, flow control means and piping.

4. A food freezer according to claim 3 wherein said cryogen injection means includes means for mounting said injection means at different vertical levels.

5. A food freezer according to claim 4 wherein said injection means include spring-loaded means for closing the orifices of said spray nozzles, means is provided for supplying liquid $CO_2$ to said piping and means is provided for supplying gaseous $CO_2$ to pressurize the interior of said piping at a pressure above the triple point pressure of $CO_2$.

6. A food freezer according to claim 1 wherein second blower means is axially positioned at the other axial end of said cage to suck gas from the interior of said cage.

7. A food freezer comprising
a thermally insulated enclosure,
a cage located within said enclosure mounted for rotation about a vertical axis, said cage being of generally circular cross-section having its sidewall formed of a plurality of generally uniformly spaced apart vertical bars,
means for rotating said cage about its vertical axis,
an endless flexible conveyor belt within said enclosure and disposed helically about said cage in frictional engagement along its inner edge with said cage bars, said belt also having loading and unloading sections,
said enclosure having entrance means and exit means through which food products being frozen can be introduced and removed,
blower means in communication with one axial end of said cage for circulating gas within said enclosure to withdraw heat from food products being frozen, said blower means sucking gas from the interior of said cage and discharging gas into a region generally between the interior wall of said enclosure and said helically disposed belt so that gas flow is generally radially inward across the food products being carried on said helical belt,
refrigeration means for cooling the gas within said enclosure to a temperature of about $-30°$ F. or below, and
adjustable restrictor means associated with said spaced apart vertical bars to create gradients of radially inward gas flow in heat transfer relationship with food products on said helical belt portion which gradients vary vertically throughout said helical section and can be altered for different food products by changing the positions of said adjustable restrictor means.

8. A food freezer according to claim 7 wherein said cooling means includes cryogen injection means positioned to inject liquid cryogen radially inward so that said injected cryogen impinges upon food products carried on said belt.

9. A food freezer according to claim 8 wherein said cryogen injection means is located in a lower one-half of said enclosure and wherein said entrance means is located vertically below said exit means so said belt travels upward throughout said helical section.

10. A food freezer according to claim 9 wherein said restrictor means occupies more of the space between adjacent vertical bars in the upper portion of said cage than in the lower portion and thus allows less radially inward flow of gas in the upper region of said helical belt section where the food products are approaching said unloading section.

11. A food freezer according to claim 8 wherein said cryogen injection means includes a plurality of spray nozzles, flow control means and piping.

12. A food freezer according to claim 11 wherein said cryogen injection means includes means for adjustably mounting said injection means at different vertical levels.

13. A food freezer according to claim 12 wherein said injection means include spring-loaded means for closing the orifices of said spray nozzles, means is provided for supplying liquid $CO_2$ to said piping and means is provided for supplying gaseous $CO_2$ to pressurize the interior of said piping at a pressure above the triple point pressure of $CO_2$.

14. A food freezer according to claim 7 wherein said blower means is a centrifugal blower mounted in axial alignment at the upper end of said cage and in an orientation to discharge gas radially outward in a substantially 360° path near the top of said enclosure and wherein a plug in the shape of a generally conical surface blocks axial flow through the lower end of said cage.

15. A food freezer according to claim 14 wherein a lower part of said blower is located at least partially within the confines of the rotating cage, wherein an annular shield is associated with the upper end of said cage to block radially inward flow in a region at the upper end of said cage, and wherein said belt is of open mesh material allowing gas to be sucked vertically downward past food products on the open mesh belt in the uppermost region of the helical section exterior of said annular shield.

16. A food freezer according to claim 7 wherein a plurality of said adjustable restrictor means are slideably telescopically mounted on said vertical bars to permit vertical movement therealong.

17. A food freezer according to claim 7 wherein said adjustable restrictor means are pivotably mounted upon said vertical bars so as to pivot in horizontal directions about vertical pivot points.

18. A food freezer according to claim 17 wherein said restrictor means include vertically elongated plates of a width proportioned to the spacing between adjacent one of said vertical bars.

19. A food freezer according to claim 18 wherein at least two sets of said adjustable restrictor means are provided at different vertical levels about the entire periphery of said cage.

20. A food freezer according to claim 7 wherein said adjustable restrictor means are pivotally mounted on said vertical bars to pivot in a vertical plane.

21. A food freezer according to claim 7 wherein centrifugal blower means is located in axial alignment and generally adjacent one vertical end of said rotating cage, wherein said enclosure includes a separate compartment wherein cooling coil means is located, wherein an entrance to said compartment is located near the vertical end of said compartment adjacent said blower means, wherein stationary baffle means is provided to direct a portion of the discharge flow from said blower means to said entrance, and wherein means is provided in the opposite vertical end of said compartment for returning cold gas to the main region of said enclosure wherein said conveyor belt is located.

22. A food freezer according to claim 21 wherein said gas return means is located vertically below said cooling coil means, is mounted in a vertical wall section that forms a portion of said compartment and comprises auxiliary blower means taking its suction from the region of said compartment below said cooling coil means.

23. A food freezer comprising
a thermally insulated enclosure, a cage located within said enclosure mounted for rotation about a vertical axis and having opposite axial ends, said cage being of generally circulate cross-section and having a generally open sidewall formed of a plurality of generally vertically extending members, means for rotating said cage about its vertical axis, an endless flexible conveyor belt within a main region of said enclosure and disposed helically about said cage in engagement along its inner edge with said cage, said belt also having loading and unloading sections, said enclosure having entrance means and exit means through which food products being frozen can be introduced and removed, centrifugal blower means in axial alignment with and generally adjacent one axial end of said cage for sucking gas from the interior of said cage and discharging high pressure gas radially outward in a substantially 360° path into a region generally between the interior wall surfaces of said enclosure and said helically disposed belt, means at the other axial end of said cage preventing gas flow therethrough toward said centrifugal blower means so that a generally radially inward gas flow is created across the food products being carried on said helical belt, a separate compartment formed in said enclosure having vertically opposite ends and having an entrance located at one end near the region of said enclosure where said centrifugal blower means discharges high pressure gas, cooling coil means located in said compartment so that only a portion of the gas discharged from said blower means flows therethrough and creates a cold gas region at the end of said compartment opposite the entrance end, and auxiliary blower means taking its suction from said cold gas region of said compartment which returns cold gas to the main region of said enclosure wherein said conveyor belt is located where such cold gas traverses said belt.

24. A food freezer according to claim 23 wherein stationary baffle means is provided to direct a portion of the discharge flow from said centrifugal blower means to said entrance.

25. A food freezer according to claim 23 wherein said centrifugal blower means is located near the upper vertical end of said enclosure and wherein said auxiliary blower means is located vertically below said cooling coil means and mounted in a generally vertical wall section that forms a portion of said compartment.

* * * * *

UNITED STATES PATENT AND TRADEMARK OFFICE
CERTIFICATE OF CORRECTION

PATENT NO. : 4,953,365
DATED : September 4, 1990
INVENTOR(S) : HELICAL CONVEYOR FREEZER It is certified that error appears in the above-identified patent and that said Letters Patent is hereby corrected as shown below:

On the title page:
Abstract, line 15, change "the" (first occurrence) to --and--.

Column 4, line 16, change "!5" to --15--.
Column 5, line 38, change "360." to --360°--.
Column 10, line 63, change " 63", " to --63"'--.
Column 11, line 12, change "23" to --123--.
Claim 1, column 14, line 17, change "above" to --about--.
Claim 1, column 14, line 32, change "such" to --suck--.
Claim 2, column 14, line 59, change "as" to --said--.
Claim 23, column 17, line 3, change "circulate" to --circular--.

Signed and Sealed this

Fourteenth Day of July, 1992

*Attest:*

DOUGLAS B. COMER

*Attesting Officer*         *Acting Commissioner of Patents and Trademarks*